D. HELLER,

Assignor to FARMERS' MANUFACTURING COMPANY.

Drag-Saw

No. 8,818. Reissued July 22, 1879.

Inventor

Daniel Heller by L. M. Hosea his attorney

Attest

L. M. Hosea

C. F. Hosea

N. PETERS, PHOTO-LITHOGRAPHER, WASHINGTON, D. C.

UNITED STATES PATENT OFFICE.

DANIEL HELLER, OF MILTON CENTRE, ASSIGNOR TO FARMERS' MANUFACTURING COMPANY, OF CINCINNATI, OHIO.

IMPROVEMENT IN DRAG-SAWS.

Specification forming part of Letters Patent No. 109,900, dated December 6, 1870; Reissue No. 8,818, dated July 22, 1879; application filed June 25, 1879.

*To all whom it may concern:*

Be it known that I, DANIEL HELLER, of Milton Centre, Wood county, Ohio, have invented certain new and useful Improvements in Sawing-Machines, of which the following is a specification.

The object of my invention is to provide a sawing-machine for operating a cross-cut or other wood-saw by the power of a single person, in which the weight of the operator may be utilized as a motive power in connection with muscular effort exerted in easy and natural positions and movements of the body.

To this end it consists in the construction and arrangement of a "riding" saw-machine, composed, essentially, of a pivoted saw-lever, vibrating in front of the operator within convenient reach of his hands, and between his feet, together with a movable actuating-seat connected therewith; and also in the combination of foot-braces with said saw and seat-lever, all so combined and operating that by the alternate transfer of the operator's weight from the seat-lever to the foot-braces, aided by suitable muscular effort of his arms upon the saw-lever, the saw is driven to and fro in the kerf.

Figure 1:
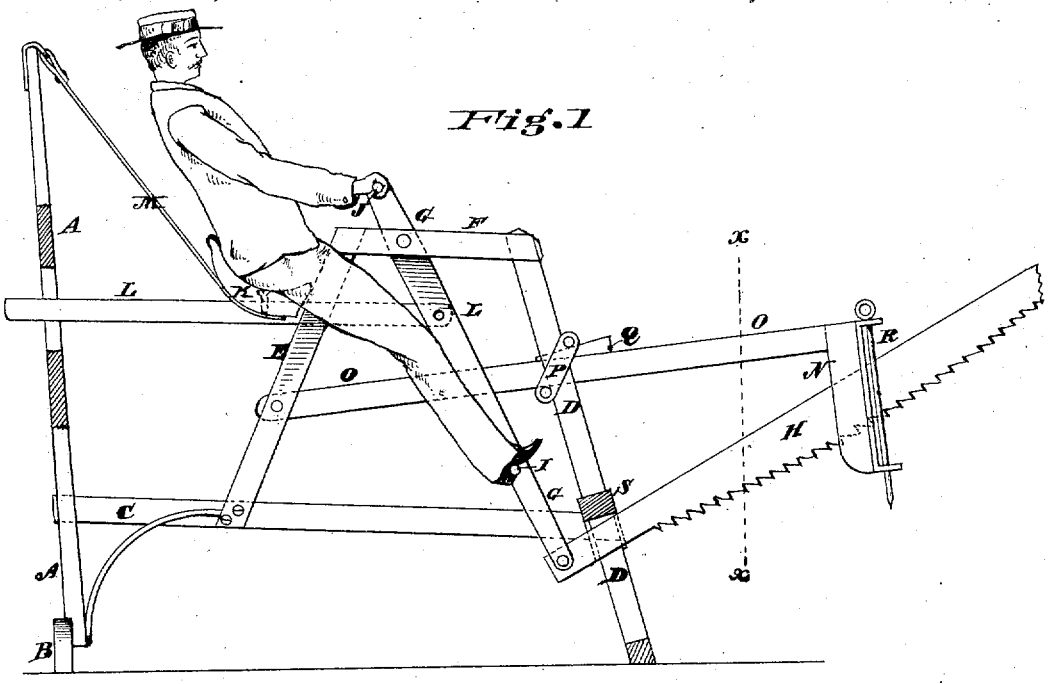
Figure 2:
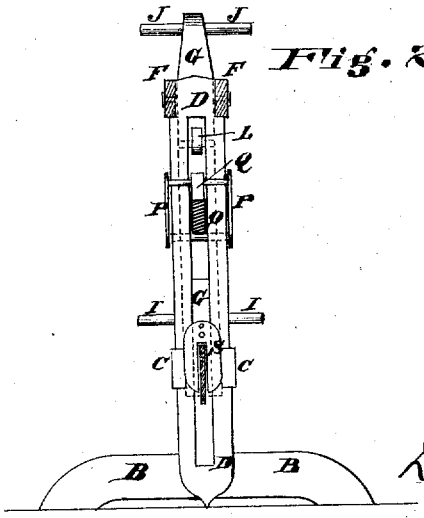

In the drawings herewith I have shown a sawing-machine, exhibiting one mode of embodying the principles of my invention, Figure 1 being a side view of the machine, part being broken away to show the construction, and Fig. 2 being a detail sectional view of the same, taken through line *x x*, Fig. 1.

The frame of the machine shown consists of an upright, A, rigidly attached to a cross-piece, B, which rests upon the ground and gives a lateral support, two parallel base sills, C, secured to the sides of the upright A, extending thence forward and secured in front to uprights D, which latter rest upon the ground below, and are connected at their upper ends by short sills F extending rearward to uprights E rising from the base sills. The frame thus constituted is light, and, by reason of the inclination of uprights D and E toward each other in the manner of bridge-struts and their cross-connections, it is strongly braced to resist the strain of the saw movement.

Between the upper sills, F, is pivoted a saw-lever, G, provided at its upper end with lateral handles J for the convenience of the operator, and extending below, so as to vibrate longitudinally between the base sills, C.

By means of a slot in its lower end and a suitable fastening a saw, H, is connected therewith, and extends forward between the uprights D, between which it reciprocates.

The seat-lever L is pivoted at its forward end to the saw-lever G at a point below its main working-pivot, and extends to the rear between the uprights E and through a slot in the upright A, by which it is guided. It is provided with a saddle, K, for the operator, and is suspended by a suitable support or connection, M, suspended from the upright A.

In the drawings the saw is shown at the extreme point of its forward thrust, and the seat-lever is at its most elevated position. It will be seen that the weight of the operator upon the seat tends to bring the swinging support or connection M from the inclined to nearly a vertical position, and draw back the lower end of the saw-lever and the saw. It will also be apparent that in the muscular effort of the operator in thrusting forward the handles of the saw-lever the seat becomes the fulcrum of the body-leverage, and materially aids the movement of the seat L downward and backward and the described effect upon the saw.

When the saw has reached the limit of its backward stroke the leverage of the body is exerted in the opposite direction by the effort of drawing the saw-lever handles backward.

In order, however, to utilize fully the weight of the body in this direction also, I prefer to use foot-braces, which, in the present case, consist of pins I, extending laterally from the saw-lever, in convenient position for the feet of the operator. When the saw is in position to begin its forward thrust, the operator may rest his weight upon the foot-braces, and by drawing back the saw-lever handles with his arms the foot-braces I become the fulcrum for the body-leverage and cause the weight of the operator to thrust the saw forward in the kerf. Thus by alternately shifting his weight from the actuating seat-lever L to the foot-braces I the saw may be reciprocated independently of the aid of the arms; but when the muscular effort of the arms upon the saw-lever handles is added to the weight of the operator a very powerful thrusting and withdrawing force is communicated to the saw, which thus enables one man to do more work than two men with the ordinary saw, and with greater ease.

The remaining devices relate to the adjustment and control of the saw. These consist, first, of an arm, O, pivoted to and extending forward from the upright E, and terminated by a downwardly-projecting head, N, vertically slotted for the passage of the saw.

The arm O passes through a slot in the upright D, which guides it in its vertical movement. The head N is secured in position upon the log by a pin, R, which passes through suitable eyes attached to the head N, and is driven into the log beside which the machine is placed. When thus secured the arm O is firmly secured to the frame of the machine by a link inclosing both the arm and the upright D, which is drawn taut by a wedge, Q, driven under it, as shown, or by any other suitable means.

I provide also a guard, S, having suitable lateral flanges to guide it in its vertical movement between the uprights D, and slotted so as to inclose the sides and ride upon the saw. The guard thus serves the purpose of holding the saw to its work in the kerf, and also to guide the saw and prevent "buckling."

Having described my invention, I claim as my invention—

1. A riding saw-machine consisting, essentially, of a suitable supporting frame-work and a pivoted saw-lever, combined with an actuating-seat adapted to operate a crosscut-saw by the combined weight and strength of a single person, substantially as and for the purpose specified.

2. The combination and arrangement, in a sawing-machine, of a pivoted saw-lever and an actuating seat-lever in such relation that when the operator is seated in position to operate the machine the upper end of the saw-lever vibrates to and fro in front of his body, and the lower part between his feet, substantially as specified.

3. In a sawing-machine, in combination with a pivoted saw-lever, a vibrating actuating-seat, so connected therewith that the weight of the operator upon the seat actuates the saw-lever and withdraws the saw in the kerf, substantially as specified.

4. In a sawing-machine having a suitable supporting frame-work, a pivoted saw-lever, in combination with an actuating seat-lever and foot-braces, so arranged and operating that the alternate transfer of the operator's weight from the seat-lever to the foot-braces reciprocates the saw, substantially as specified.

In testimony whereof I have hereunto set my hand this 21st day of June, 1879.

DANIEL HELLER.

Witnesses:
NATHANIEL HELLER,
C. F. HESSER.